US005418330A

United States Patent [19]

Rook

[11] Patent Number: 5,418,330

[45] Date of Patent: May 23, 1995

[54] APPARATUS FOR GROUNDING AN INTERNAL LIGHTNING PROTECTOR DEVICE

[75] Inventor: Peter Rook, Harsefeld, Germany

[73] Assignee: Deutsche Aerospace Airbus GmbH, Hamburg, Germany

[21] Appl. No.: 56,254

[22] Filed: Apr. 30, 1993

[30] Foreign Application Priority Data

May 1, 1992 [DE] Germany ........................ 42 14 508.2

[51] Int. Cl.$^{6}$ ........................................ H02G 15/02

[52] U.S. Cl. .................................... 174/78; 174/75 C; 174/88 C; 439/96; 439/98; 439/610

[58] Field of Search ...................... 174/78, 75 C, 88 C; 439/96, 98, 610, 578, 579

[56] References Cited

U.S. PATENT DOCUMENTS

| | | | |
|---|---|---|---|
| 1,941,905 | 1/1934 | Mair . | |
| 3,141,924 | 7/1964 | Forney, Jr. | 174/75 C |
| 3,280,246 | 10/1966 | Lawson et al. . | |
| 3,307,137 | 2/1967 | Tordoff et al. | 439/610 |
| 4,080,024 | 3/1978 | Kroon | 174/78 X |
| 4,243,290 | 1/1981 | Williams | 439/610 |
| 4,257,658 | 3/1981 | Hammond et al. | 174/78 X |
| 4,830,629 | 5/1989 | Yoshimura | 439/610 |
| 4,838,808 | 6/1989 | Fujiura | 439/610 |

FOREIGN PATENT DOCUMENTS

| | | | |
|---|---|---|---|
| 0328234 | 8/1989 | European Pat. Off. . | |
| 1118849 | 12/1961 | Germany | 439/610 |
| 1515421 | 6/1969 | Germany . | |
| 1515404 | 12/1969 | Germany . | |
| 176572 | 8/1971 | Germany . | |
| 3308492 | 8/1985 | Germany . | |
| 401198 | 4/1965 | Switzerland . | |
| 389719 | 7/1965 | Switzerland . | |

*Primary Examiner*—Morris H. Nimmo

*Attorney, Agent, or Firm*—W. G. Fasse; W. F. Fasse

[57] ABSTRACT

An effective grounding of electrical equipment, electrical cables, housings, and the like, is accomplished by connector lugs that are initially formed as an integral part, for example, of a connecting sleeve that surrounds a protective casing or an envelope of a cable in a crimping manner. The lugs are only bent out of the sleeve or housing portion or the like when needed. A grounding conductor is then secured to the lug, for example, by a screw connection or by a plug-in connection or the like. The present lugs may be incorporated in all systems that are provided for protection against surge currents or excessive voltages produced by a thunderstorm, especially in a vehicle or a craft, e.g. an aircraft.

12 Claims, 2 Drawing Sheets

APPARATUS FOR GROUNDING AN INTERNAL LIGHTNING PROTECTOR DEVICE

FIELD OF THE INVENTION

Interior electric components also require protection against excess currents caused by lightning. For this purpose it is necessary to ground, for example cable connectors inside land vehicles, watercraft, and aircraft. The grounding of the cable connectors must be efficiently accomplished which requires a rapid connection and disconnection of the cable connector with a grounding conductor. Further, the connection must assure an effective equalization of an excess potential caused by lightning.

BACKGROUND INFORMATION

It is known that exterior lightning protection devices alone are not sufficient to prevent damage to interior electrical equipment when lightning strikes. Excess currents may still be generated in electronic and electrical devices inside a building, vehicle, or craft. Thus, steps must be taken against the effects of currents caused by lightning and the resulting magnetic and electrical fields on interior metal installations and electrical equipment. The most important step in this connection is an efficient potential equalization to avoid thunderstorm electrical damages. Such equalization is accomplished by an effective connection of the endangered equipment to grounded metallic pipes or other grounding devices, if desirable, through spark gap arrestors.

Several versions of such grounding connectors are known for realizing the grounding of lightning protection systems. Normally, a grounding conductor is secured to a metal cable clamp which in turn is connected to the component to be protected while the other end of the grounding conductor is secured to a grounded pipe system or the like. Such cable clamps have also been secured to cable end connectors, including an end housing that itself is connected to an electrically conducting, protective cable envelope or cable casing, such as a wire mesh cable envelope. The use of cable clamps for these purposes is cumbersome, at least in those instances where it is not possible to place the cable clamp around the cable end housing or a sleeve extending from the end housing due to lack of accessibility. Even if the grounding conductor can be secured to the cable clamp by a screw connection, the placement of the cable clamp itself is cumbersome. Thus, efforts have been made to provide divided cable clamps that can be placed around a cable even if there is no free cable end. However, such divided cable clamps still require a connector and a sleeve for securing the divided cable clamp.

In addition to the mechanical difficulties of properly placing a cable clamp or even a divided cable clamp, the conventional devices have the further disadvantage that transition resistances occur between the cable clamp and the component to which the cable clamp is secured. Additionally, corrosion tends to start between the clamp and the sleeve or end housing to which the clamp is secured. Besides, the clamp itself requires an additional expense for making these separate clamps and their weight adds to the weight of the system.

OBJECTS OF THE INVENTION

In view of the foregoing it is the aim of the invention to achieve the following objects singly or in combination:

- to avoid the use of separate cable clamps altogether by integrating a grounding connector directly into a cable end connector;
- to assure an efficient grounding of an electrically conducting cable envelope while minimizing transition resistances;
- to reduce the weight of such connections while simultaneously minimizing corrosion of the grinding components; and
- to provide either a screwed or a form-locking connection between a grounding conductor and an electrically conducting cable jacket.

SUMMARY OF THE INVENTION

According to the invention an electrically conducting cable casing that encloses a conventional cable is connected to a cable terminal which includes an interconnecting terminal end housing and an electrically conducting sleeve electrically connected to the cable casing for grounding. At least one connector lug forming an integral part of the electrically conducting sleeve is directly connected to the casing, for example, by crimping the sleeve to the casing. The connector lug includes a feature for electrically connecting a grounding conductor to the cable casing through the connector lug. Such connection may, for example, be accomplished by a screw connection or by a plug-in connection. For the screw connection the connector lug may be provided with a through hole or with a threaded hole. For the plug-in connection the lug may be shaped as a female or a male plug member that cooperates with a respective plug member of a grounding conductor.

In a preferred embodiment, the electrically conducting sleeve is electrically connected to the terminal end housing at one end of the sleeve while the other sleeve end has a flared collar which may facilitate the insertion of the electrically conducting cable casing into the sleeve and one or more connector lugs extend out of the flared collar, preferably at an angle to a longitudinal cable axis.

In another preferred embodiment, one or two lugs are punched out of the sleeve so that initially the lugs conform to the cylindrical configuration of the sleeve. Only when the lugs are to be connected to a grounding conductor will the lugs be bent out of the sleeve. Again, the connection to the grounding conductor may be by a screwed connection or by a plug-in connection.

It is an advantage of the invention that the connector lug initially forms an integral part of the conducting sleeve and remains integrally connected to the sleeve to avoid transition resistances as well as corrosion caused by metal surfaces contacting each other.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND 0F THE BEST MODE OF THE INVENTION

Figure 1:
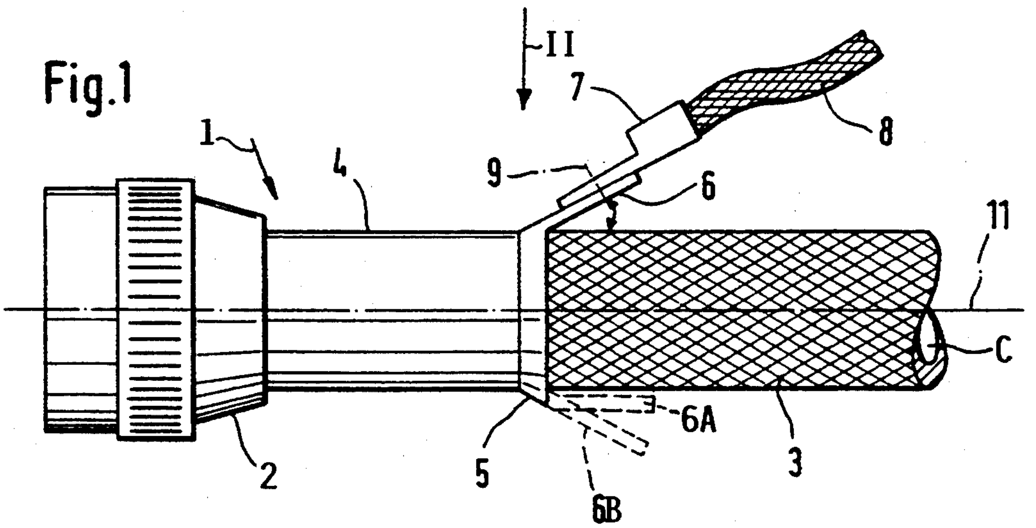
FIG. 1 is a side view of a first embodiment of the grounding device according to the invention connected to a grounding conductor.
Figure 2:
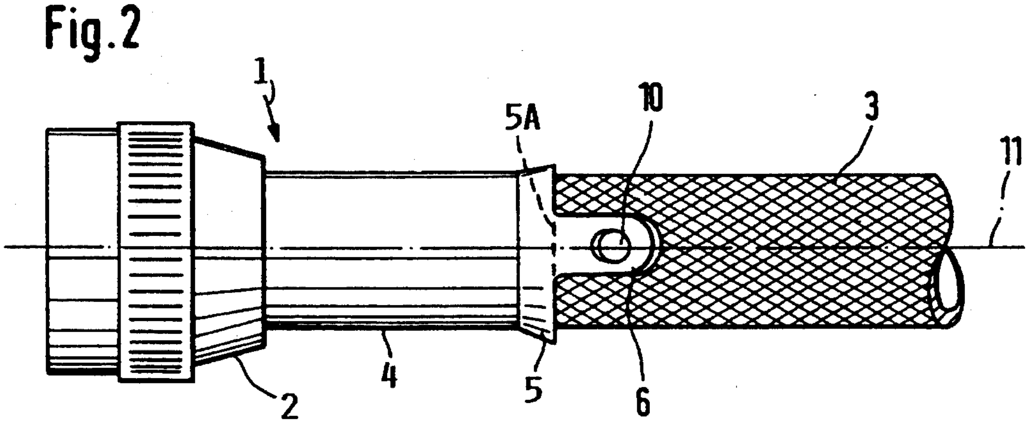
FIG. 2 is a view in the direction of the arrow II in FIG. 1 with the grounding conductor omitted.

FIGS. 1 and 2 show a first embodiment of the invention. A cable C is connected to an end connector 1 having an end housing 2 and an electrically conducting sleeve 4 crimped onto an electrically conducting cable casing 3, such as a wire mesh envelope surrounding the cable C. The left-hand end of the preferably cylindrical sleeve 4 is connected to the end housing 2 that may be rotatable relative to the sleeve 4. The right-hand end of the sleeve 4 has a flaring collar 5 which, according to the invention, is provided with at least one, preferably two, grounding connector lugs 6 and 6A which are integral or single-piece elements of the sleeve 4. The lugs 6, 6A may initially extend substantially in a cylindrical plane defined by said sleeve 4 and in parallel to the surface of the conducting wire mesh cable casing 3. The lugs 6,6A are bent out into the position 6B prior to use. In the use position, an angle will be formed between the plane of the connector lug 6 and the longitudinal cable axis 11 to conveniently provide a screw connection 9 between a cable terminal 7 and the lug 6, 6A. The cable terminal 7 is conductively connected to a grounding conductor 8 of conventional construction. The flaring collar 5 facilitates the insertion of the cable casing 3 into the sleeve 4 prior to the crimping action. Additionally, as shown in FIG. 2, the lugs 6,6A are integrally connected at 5A to the collar 5 of the electrically conducting sleeve 4, whereby the lugs 6, 6A and the sleeve 4 form a single-piece electrical conductor. The screw connection 9 may be accomplished either by a through-hole 10 for passing a bolt through the hole which is then tightened by a nut or by providing the hole with a threading.

The sleeve 4 is preferably constructed as a crimping bushing, the left-hand end of which has a form-locking connection with the end housing 2 while the body of the sleeve 4 itself is tightly crimped onto the electrically conducting cable casing 3 to provide an electrical connection between the elements 2, 3, and 4 and thus also with the flaring collar 5 and the connector lugs 6, 6A. Preferably, the electrically conducting cable casing 3 forms a flexible envelope that reaches all the way to the end housing 2. The lugs 6, 6A and thus the sleeve 4 with its collar 5 are made of electrically well conducting material such as copper or aluminum. The cable casing 3, or rather the wire mesh thereof, is also made of electrically well conducting material that is simultaneously sufficiently flexible. Copper nickel alloys are suitable for this purpose. The sleeve 4 may also be a suitable alloy to provide the intended clamping force initially imposed by the crimping action.

Figure 3:
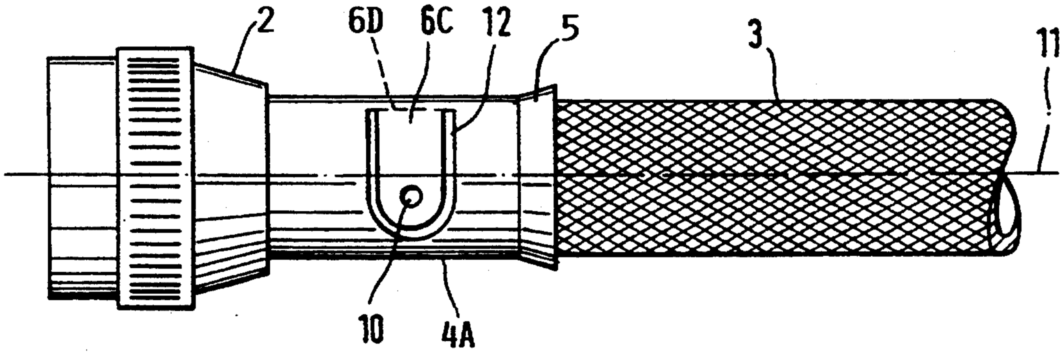
FIG. 3 is a side view of a second embodiment in which the connector lug conforms initially to the cylindrical configuration of an electrically conducting sleeve.
Figure 4:
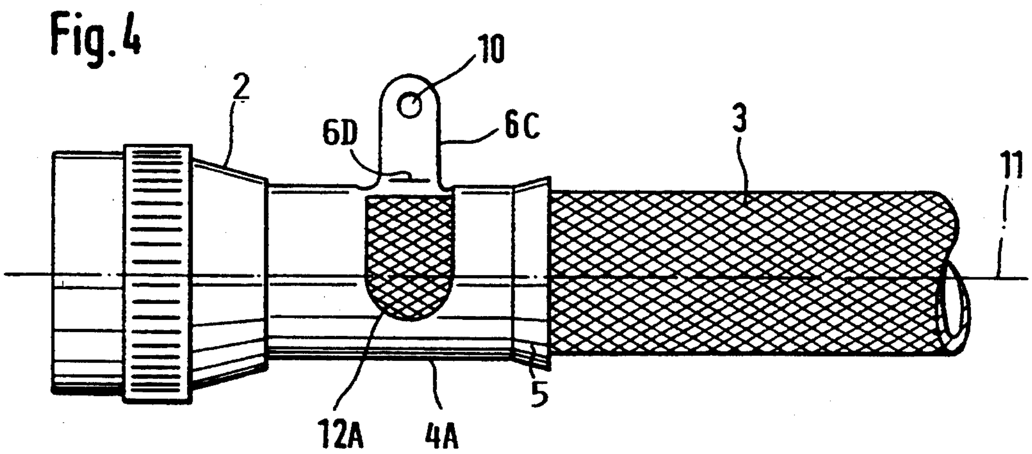
FIG. 4 is a view similar to that of FIG. 3, but now showing the connector lug bent out of the cylinder of the conductor sleeve.

FIGS. 3 and 4 show another embodiment of the invention in which a modified electrically conducting crimped sleeve 4A has stamped therein a grounding connector lug 6C which is formed, for example, by stamping a through-going gap 12 into the sleeve 4A, thereby leaving the tongue-shaped lug 6C integrally connected to the sleeve 4A as shown at 6D to form a single-piece electrical conductor. Initially, the tongue-shaped lugs 6C conforms to the cylindrical curvature or plane defined by the sleeve 4A and the lug is bent out of the cylinder only when ready to use as shown in FIG. 4, whereby the lug 6C extends substantially radially away from the central axis 11 of the cable. FIG. 4 also shows that the cable casing 3 forming a protective envelope extends all the way through the sleeve 4A as is visible at 12A.

Figure 5:
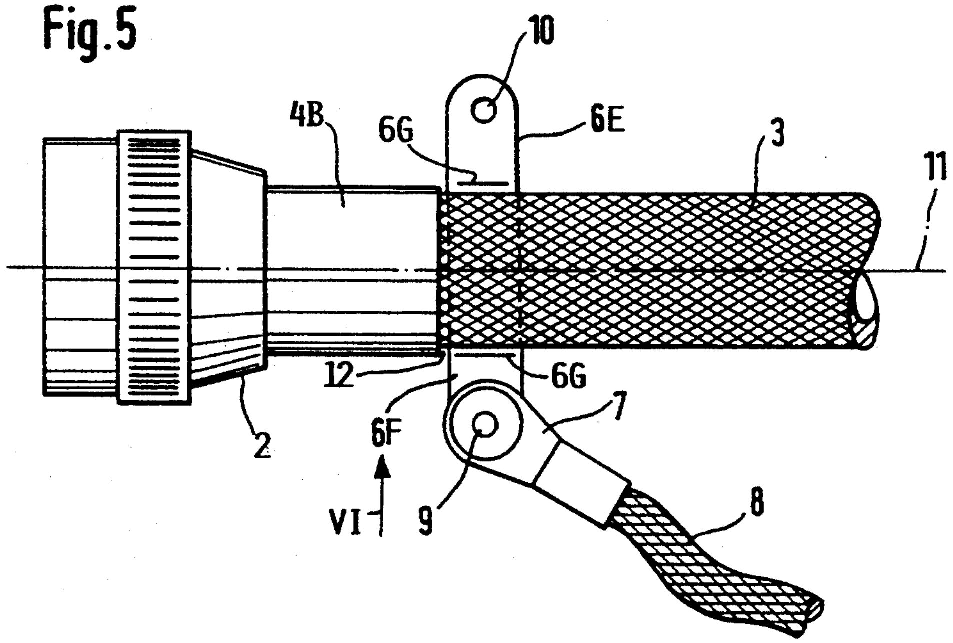
FIG. 5 is a side view of another embodiment in which the end portion of the conductor sleeve is formed into two connector lugs that initially may also be bent into the cylindrical shape of the conductor sleeve.
Figure 6:
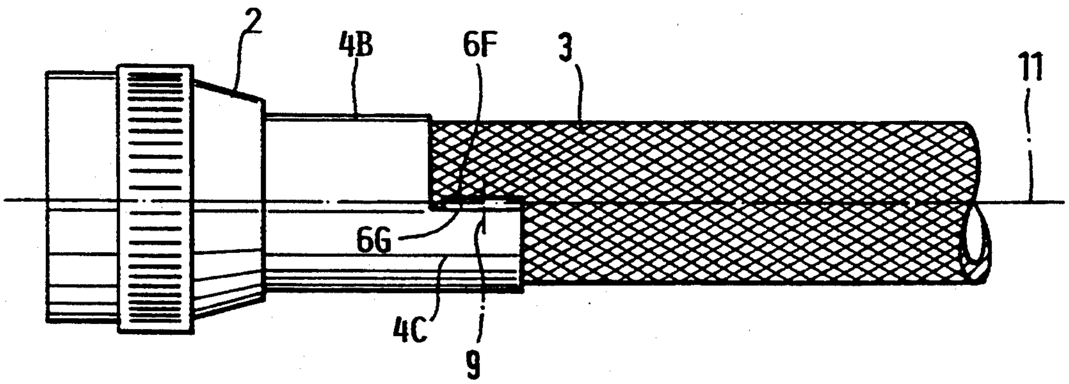
FIG. 6 shows the embodiment of FIG. 5 in the direction of the arrow 6 in FIG. 5 with the grounding conductor omitted.

FIGS. 5 and 6 show yet another embodiment of the invention in which an electrically conducting a sleeve 4B is provided with two integral grounding connector lugs 6E and 6F. These lugs 6E and 6F remain integrally connected to the sleeve 4B as shown at 6G for example in FIG. 5, and at 4C in FIG. 6 to form a single-piece electrical conductor. FIG. 6 illustrates a side view in the direction of the arrow VI in FIG. 5, whereby it is clear that the lugs form an integral part of the sleeve 4B in that initially a groove is cut around approximately 180° of the sleeve 4B, while simultaneously or subsequently also making a shaping cut to form the tongue-shaped configurations of the lugs 6E and 6F. At this time, the lugs still conform to the cylindrical configuration or cylindrical configuration defined by of the sleeve 4B. Only when a connection as shown at 9 in FIG. 5 is to be made, will the lugs be bent out of the cylindrical configuration. The connection of the grounding conductor 8 with its cable terminal 7 to the lug by a screw 9 is the same as described above.

The grounding connector lugs according to the invention can be incorporated into any crimping sleeves permanently connected to cables or other electrical or electronic components for subsequent bending out of the sleeve configuration for using these grounding lugs. The type of connection between the grounding lug and a cable terminal can be selected as is convenient for any particular purpose, whereby the screw connection illustrated as well as plug-in connections, are available for the present purposes. It has been found that an effective grounding is possible, and that transition resistances have been minimized due to the integral connection of the present lugs to the conducting sleeves. Corrosion has also been reduced.

Although the invention has been described with reference to specific example embodiments, it will be appreciated that it is intended to cover all modifications and equivalents within the scope of the appended claims.

What I claim is:

1. A device for grounding a cable for protection against lightning, comprising a cable terminal for enclosing a cable having a protecting electrically conducting cable casing, said cable terminal including an interconnecting terminal end housing and an electrically conducting sleeve for electrically contacting a cable casing for grounding, and at least one connector lug forming an integral part of said electrically conducting sleeve so that said electrically conducting sleeve and said connector lug form together a one-piece electrical conductor, said connector lug comprising means for electrically connecting a grounding conductor to a cable casing through said one-piece electrical conductor, wherein said connector lug extends prior to use substantially in a cylindrical plane defined by said electrically conducting sleeve, and wherein said connector lug extends out of said cylindrical plane for using said connector lug.

2. The device of claim 1, wherein said electrically conducting sleeve has a flaring end collar opening away from said end housing.

3. The device of claim 1, wherein said connector lug is punched out of said electrically conducting sleeve so that said connector lug has the same wall thickness as said electrically conducting sleeve and remains connected to said electrically conducting sleeve.

4. The device of claim 1, wherein said connector lug extends away from said electrically conducting sleeve at an angle to a longitudinal sleeve axis after bending said connector lug out of said cylindrical plane.

5. The device of claim 1, wherein said connector lug extends radially away from said electrically conducting sleeve after bending said connector lug out of said cylindrical plane.

6. The device of claim 5, comprising two connector lugs extending radially away from opposite sides of said electrically conducting sleeve after bending said connector lugs out of said cylindrical plane.

7. The device of claim 1, wherein said connector lug extends prior to use, circumferentially in said cylindrical plane defined by said electrically conducting sleeve, and wherein a groove (12) extends partly between said connector lug and said electrically conducting sleeve except along a generatrix of said electrically conducting sleeve where said connector lug is integrally connected to said electrically conducting sleeve, whereby said connector lug can be bent out of said electrically conducting sleeve prior to connecting said connector lug to said grounding conductor.

8. The device of claim 2, wherein said connector lug extends away from said flaring end collar of said electrically conducting sleeve at an angle to a longitudinal sleeve axis.

9. The device of claim 1, wherein said connector lug has a free end with a rounded edge.

10. The device of claim 1, wherein said connector lug is constructed for holding a cable terminal of said grounding conductor.

11. The device of claim 1, wherein said connector lug has a flat surface with a hole through said flat surface and wherein a screw for securing a cable terminal of said grounding conductor passes through said hole.

12. The device of claim 1, wherein said electrically conducting sleeve is a bushing crimped onto an electrically conducting cable casing of said cable for electrically contacting said electrically conducting cable casing.

* * * * *